March 22, 1932.  A. JACKSON  1,850,350
POWER ATTACHMENT
Filed March 10, 1930
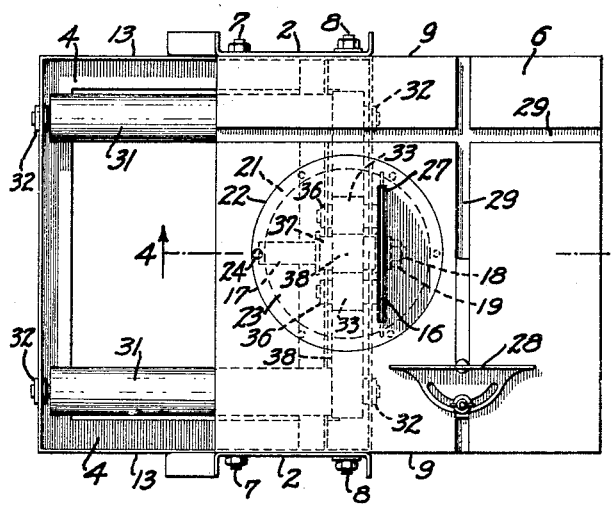
Fig. 1
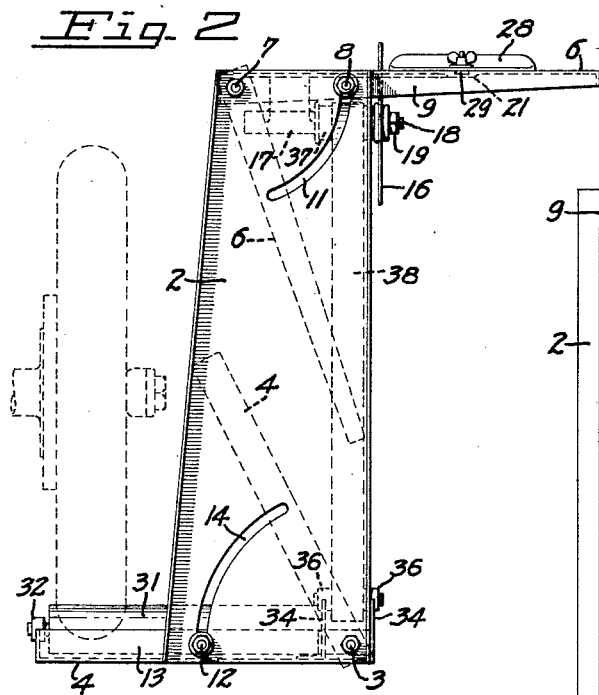
Fig. 2
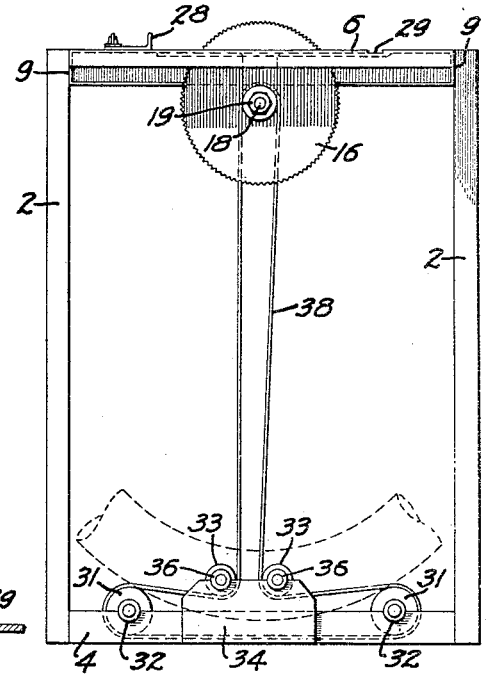
Fig. 3
Fig. 4
INVENTOR.
ALEXIS JACKSON
BY Charles V. Evans
HIS ATTORNEY Patented Mar. 22, 1932

1,850,350

UNITED STATES PATENT OFFICE

ALEXIS JACKSON, OF SAN FRANCISCO, CALIFORNIA

POWER ATTACHMENT

Application filed March 10, 1930. Serial No. 434,508.

My invention relates to a power attachment and particularly to such an attachment for an automobile.

One of the objects of the invention is the provision of a power attachment for operating a tool or other power receiver.

Another object of the invention is the provision of a power attachment which embodies the power receiver, and is held stable by the driving vehicle.

A further object of the invention is the provision of a power attachment of the character described which may be collapsed into convenient form for transportation.

The invention possesses other objects and features of advantage, some of which, with the foregoing will be set forth in the following description of my invention. It is to be understood that I do not limit myself to this disclosure of species of my invention, as I may adopt variant embodiments thereof within the scope of the claims.

Referring to the drawings:

Figure 1 is a plan view of the power attachment embodying my invention.

Figure 2 is a side elevation of the power attachment; and Figure 3 is a front view of the same; portions of a vehicle wheel are shown in dotted lines to indicate the operative relationship.

Figure 4 is a vertical sectional view of the power receiver and its mounting taken in a plane indicated by the line 4—4 of Figure 1.

It has been the practice to operate grinders, saws and other devices, which for convenience I will term power receivers, by a belt running on a pulley secured to a driven vehicle wheel. This method of taking power from the vehicle is unsatisfactory because it requires blocking up the vehicle rear end for each operation. Furthermore the projecting pulley on the vehicle wheel is a constant source of danger while driving; and always detracts from the appearance of the automobile. The purpose of this invention is to overcome these undesirable features; and at the same time provide a power attachment that is simple, efficient and readily portable.

In terms of broad inclusion the invention comprises a collapsible frame, for supporting an adjustably mounted power receiver. Driving and stabilizing means, preferably adapted to be positioned under a vehicle wheel to engage the periphery thereof, is provided; and transmission means is also provided for connecting the drive means with the power receiver.

In greater detail, the invention comprises a frame having the spaced channel supports or legs 2. Pivotally secured between the lower ends of these legs, by the bolts 3, is a rectangular, rearwardly extending ground engaging base 4. In a similar manner a rectangular, forwardly extending work table 6 is pivotally mounted between the upper ends of the legs by the bolts 7.

In order to limit the movement of the base 4 and the work table 6, suitable securing means are provided. The lock bolts 8, passing through the flanges 9 on opposite edges of the table, engage the arcuate slots 11 in the legs 2. Similar bolts 12, passing through the flanges 13 on opposite edges of the base, engage the slots 14 in the legs. The slots are positioned so that the base and work table may be moved to and secured in either the extended horizontal position, or in the retracted collapsed position. In the retracted positions, the base and work table lie wholly between the legs; these positions being indicated by dotted lines in Figure 2.

From the above construction it is apparent that the frame is collapsible; and when the base and work table are in the retracted positions, the whole is folded together into a box-like construction which is very convenient for carrying. On the other hand, when locked in the extended operative positions, the base 4 provides a stable foundation for the frame, and the work table 6 provides a convenient support for the power receiver.

A power receiver, such as the circular saw 16, is journaled on the work table 6, in a suitable bearing 17; the saw being secured to a shaft 18, by the lock nut 19. For the purposes of illustration a saw is shown; it is to be noted however that any other similar device such as a grinding disk, or drill may be operated in a like manner.

In order to give added usefulness to the tool, the saw 16 is adjustably mounted to swing on an axis perpendicular to its axis of rotation. A circular aperture is provided in the central portions of the work table 6; and an inwardly projecting flange 21 is provided about the lower portions of the aperture to form an annular rabbet 22 in the top of the work table. Positioned in this rabbet is a circular plate or turn-table 23, having a thickness substantially equal to that of the work table, so that the top surfaces are flush.

Means are provided for setting the turn-table 23 in a selected position, and to this end a headed pin 24 is provided. The head of the pin seats in an aperture provided near the periphery of the turn-table, and the shank 26 of the pin projects through one of a number of flange apertures spaced about the flange 21. By merely placing the pin in one of the series of flange apertures, a given setting of the saw may be made. The saw bearing 17 is fixed on the under side of the turn-table 23; and a slot 27 is provided in the turn-table so that the saw 16 may project therethrough.

To facilitate the use of the saw, an adjustable work guide 28 is preferably provided. The guide is arranged to slide on the top of the work table in suitable guide grooves 29. This type of guide means is of course well known. For ripping long pieces or cross cutting short ones, the saw may be positioned as shown in the drawings. For cross cutting long pieces, the turn-table is swung to position the saw at right angles to the position shown.

The power attachment is designed to derive its power from a drive wheel of an automobile; and driving means are provided whereby this end is accomplished without having to block-up the automobile rear end, or requiring any attachments on the wheel. At the same time, a portion of the vehicle weight is utilized to stabilize the power attachment.

A pair of spaced rollers 31 are journaled in the base 4, in the bearings 32, and are closely adjacent the surface upon which the power attachment is placed. These rollers are mounted parallel to the planes of the legs 2, and have a length substantially equal to that of the base so that they project rearwardly with its extended portion. From this construction it is evident that when the base is in extended position the rollers are horizontal.

The spacing of the rollers 31 is less than the diameter of the vehicle wheel; and hence they are adapted to engage the periphery of the wheel when it is resting on the rollers; this operative position being shown in Figures 2 and 3. By this arrangement it is evident that a rotation of the vehicle wheel will cause a rotation of the rollers 31.

Transmission means is provided for rotatably connecting the rollers and power receiver; and a belt drive is preferably used for this purpose. A pair of spaced idler pulleys 33 is journaled in the base portions 34 in the bearings 36. These pulleys are positioned between the rollers 31 and are spaced under the saw pulley 37, with one of the pulleys directly below the saw pulley. A belt 38, running on the foreward ends of the rollers, is directed upwardly by the guide pulleys, and is guided over the saw pulley 37.

The belt drive, in combination with the collapsible feature of the frame and the turntable mounting of the power receiver, is to be noted. The flexibility of a belt drive in this case permits both of these features to exist in a very simple mechanism. Also, since the face of one of the pulleys 33 is directly below saw pulley 37, the belt, when driven, will remain in firm engagement with pulley 37 regardless of the position of the saw.

Since the saw is mounted on the work table, it will swing down into a protected position between the legs when the work table is in the retracted position. If it is desirable to do so, the whole saw mounting can be lifted out with the turn-table and be carried in a separate container.

The operation of the power attachment is as follows: Considering that the frame is in the collapsed condition, and that it has been transported in this convenient form to the job, the lock bolts 8 and 12 are loosened and the base 4 and the work table 6 are extended and locked in the horizontal operative positions. The belt 38, having previously been placed about the pulleys and rollers, is tightened by the movements of the base and work table into the extended positions.

Having made these adjustments, the frame is placed alongside the automobile, so that the extended portion of the base is adjacent to and in line with one of the rear wheels. It is to be noted that the attachment may be placed on either side of the vehicle, depending on the convenience of the particular location. The automobile is then moved over the extended portion of the base 4, so that a rear wheel rests upon the rollers 31; and the attachment is ready for operation.

Of course the rear wheel could be temporarily jacked-up to permit placement of the base thereunder, and at times this might be preferable, but the rollers are positioned low enough so that the vehicle may readily be pushed on or off.

A particular feature of the invention resides in the fact that a substantial portion of the vehicle weight rests upon the attachment base. Two desirable effects result from this; first, the frame is held stable, and second, a positive frictional drive is secured between the wheel tire and the drive rollers 31.

Another feature of advantage, in the operation of the power attachment, is the adjustable power receiver mounting. By merely varying the position of the turn-table 23, the tool or other device may be set at a preselected angle. If the tool being operated is a saw, this adjustment becomes valuable since long timbers may be either ripped or cross cut without being interfered with by the position of the automobile.

I claim:

1. In a power attachment for a vehicle, a ground engaging base, a pair of rollers journaled in the base and on which the vehicle wheel is adapted to rest, a work table having a flat upper surface supported on the base, a turn table arranged on the work table, a power receiving shaft journaled on the work table, idler pulleys journaled in the base below the shaft, and a belt passing around the rollers and idler pulleys to the shaft.

2. In a power attachment for a vehicle, a rectangular ground engaging base, a pair of rollers journaled in the base and on which the vehicle wheel is adapted to rest, a rectangular work table, legs pivoted to opposite edges of the base and work table so that the base and table are free to fold together, means for fixing the legs to the base and table in extended position, a power receiving shaft arranged on the table, and transmission means connecting the rollers to the shaft.

In testimony whereof, I have hereunto set my hand.

ALEXIS JACKSON.